(12) United States Patent
Wu et al.

(10) Patent No.: US 12,345,989 B2
(45) Date of Patent: Jul. 1, 2025

(54) ARRAY SUBSTRATE, HANDWRITING TABLET, TABLET ERASER, HANDWRITING TABLET SYSTEM AND METHOD FOR ERASING PATTERN

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Xiuliang Wang, Beijing (CN); Jiaxing Wang, Beijing (CN); Yu Zhao, Beijing (CN); Jian Wang, Beijing (CN); Yao Bi, Beijing (CN); Jinshuai Duan, Beijing (CN); Yang Ge, Beijing (CN); Zhilong Duan, Beijing (CN); Zhiqiang Yu, Beijing (CN); Cuiyu Chen, Beijing (CN); Feng Liu, Beijing (CN); Tianyang Han, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/682,934

(22) PCT Filed: Nov. 30, 2021

(86) PCT No.: PCT/CN2021/134290
§ 371 (c)(1),
(2) Date: Feb. 12, 2024

(87) PCT Pub. No.: WO2023/097425
PCT Pub. Date: Jun. 8, 2023

(65) Prior Publication Data
US 2024/0353726 A1    Oct. 24, 2024

(51) Int. Cl.
*G02F 1/137* (2006.01)
*G02F 1/133* (2006.01)
(Continued)

(52) U.S. Cl.
CPC .............. *G02F 1/137* (2013.01); *G02F 1/133* (2013.01); *G06F 3/042* (2013.01); *G09G 3/36* (2013.01)

(58) Field of Classification Search
CPC ........ G02F 1/137; G02F 1/133; G02F 1/0036; G02F 1/13306; G06F 3/042;
(Continued)

(56) References Cited

U.S. PATENT DOCUMENTS 4,711,977 A    12/1987  Miyamori et al.
2011/0127951 A1*  6/2011  Walley ................... H02J 50/10
                                                    320/108
(Continued)

FOREIGN PATENT DOCUMENTS

CN    201611478 U    10/2010
CN    102881274 A    1/2013
(Continued)

OTHER PUBLICATIONS

International Search Report and Written Opinion mailed on Aug. 18, 2022, in corresponding PCT/CN2021/134290, 13 pages.
(Continued)

*Primary Examiner* — Hoan C Nguyen
(74) *Attorney, Agent, or Firm* — XSENSUS LLP

(57) ABSTRACT

The present disclosure belongs to the technical field of display, and provides an array substrate, a handwriting tablet, a tablet eraser, a handwriting tablet system and a method for erasing a pattern. The array substrate is provided with a handwriting area, and a peripheral area surrounding the handwriting area. The array substrate includes erasing
(Continued)

electrodes, which are arranged in an array, and a driving circuit for driving the erasing electrodes, wherein the driving circuit is configured to load, under the irradiation of preset light, an erasing voltage to the erasing electrodes. The array substrate is further provided with an NFC coil, which is used for sending an NFC signal, wherein a sensing range of the NFC coil covers the handwriting area.

19 Claims, 10 Drawing Sheets

(51) Int. Cl.
*G06F 3/042* (2006.01)
*G09G 3/36* (2006.01)

(58) Field of Classification Search
CPC .............. G06F 3/04883; G06F 3/04842; G06F 3/03545; G06F 3/1423; G09G 3/36; H04W 4/80; H04W 12/47; H04W 4/02; H04M 15/93; H04M 2250/04; H04L 63/0492; G06Q 20/3278; H04B 5/26; H04B 5/24; H04B 5/48; H04B 5/73; H04B 1/3816; H04B 10/116; H04B 5/266; G06T 11/001; G06K 7/10297; G06K 7/10009; G06K 7/10881; B60R 2325/103; B60R 25/1004
See application file for complete search history.

(56) References Cited

U.S. PATENT DOCUMENTS

| | | | |
|---|---|---|---|
| 2017/0047361 A1* | 2/2017 | Xu | H01L 29/78678 |
| 2018/0074623 A1* | 3/2018 | Xi | G06F 3/046 |
| 2018/0246598 A1 | 8/2018 | Sainis et al. | |
| 2019/0318682 A1* | 10/2019 | Ren | H01L 29/78633 |
| 2020/0343314 A1* | 10/2020 | Nakamura | G06F 1/1698 |
| 2020/0365626 A1* | 11/2020 | Lin | G02F 1/13338 |
| 2020/0395652 A1* | 12/2020 | Mityashin | H01Q 1/526 |

FOREIGN PATENT DOCUMENTS

| | | |
|---|---|---|
| CN | 103218963 A | 7/2013 |
| CN | 104786705 A | 7/2015 |
| CN | 106098702 A | 11/2016 |
| CN | 107193169 A | 9/2017 |
| CN | 107844218 A | 3/2018 |
| CN | 109901331 A | 6/2019 |
| CN | 112327546 A | 2/2021 |
| CN | 112684618 A | 4/2021 |
| CN | 113284471 A | 8/2021 |
| CN | 113419388 A | 9/2021 |
| CN | 116194872 A | 5/2023 |

OTHER PUBLICATIONS

Office Action issued on Apr. 21, 2025, in corresponding Chinese patent Application No. 202180003669.4, 17 pages.

* cited by examiner

ARRAY SUBSTRATE, HANDWRITING TABLET, TABLET ERASER, HANDWRITING TABLET SYSTEM AND METHOD FOR ERASING PATTERN

CROSS-REFERENCE TO RELATED APPLICATION

This application is a U.S. national stage of International Application No. PCT/CN2021/134290 filed on Nov. 30, 2021, the content of which is incorporated herein by reference in its entirety for all purposes.

TECHNICAL FIELD

The present disclosure relates to the field of display technology, in particular to an array substrate, a handwriting tablet, a tablet eraser, a handwriting tablet system, and a method for erasing a pattern.

BACKGROUND

The liquid crystal handwriting tablet can be used in conjunction with a tablet eraser to achieve locally erasing function. A light source is provided on the tablet eraser to illuminate an area of the handwriting tablet to be erased. Under the illumination of the light source, the pattern in the area being illuminated will be erased.

The information disclosed in the above section is only intended to enhance the understanding of the background of the present disclosure, and thus can include information that does not constitute the prior art already known to those skilled in the art.

SUMMARY

According to a first aspect of the present disclosure, an array substrate is provided, the array substrate has a handwriting area and a peripheral area surrounding the handwriting area and includes erasing electrodes arranged in an array and a driving circuit for driving the erasing electrodes, the driving circuit is configured to load erasing voltages onto the erasing electrodes in response to illumination of preset light, and the array substrate is further provided with an NFC coil for emitting an NFC signal, with a sensing range of the NFC coil covering the handwriting area.

According to a second aspect of the present disclosure, a handwriting tablet is provided, and includes a cover plate, a liquid crystal layer, and the array substrate described above arranged in stacked manner in sequence.

According to a third aspect of the present disclosure, a tablet eraser is provided, and the tablet eraser is provided with at least one erasing unit, the erasing unit includes a light source and an NFC chip, and the erasing unit is configured to cause the light source to emit preset light in response to the NFC signal being sensed by the NFC chip, and to cause the light source not to emit light in response to the NFC signal being not sensed by the NFC chip.

According to a fourth aspect of the present disclosure, a handwriting tablet system is provided, and includes the handwriting tablet and the tablet eraser as described above.

According to a fifth aspect of the present disclosure, a method for erasing a pattern is provided, applied to the handwriting tablet system as described above, and the method for erasing a pattern includes: emitting, by the NFC coil of the handwriting tablet, an NFC signal; emitting, by the light source of the tablet eraser, preset light, in response to the NFC signal being sensed by the NFC chip of the tablet eraser, and preventing light emitting of the light source of the tablet eraser, in response to the NFC signal being not sensed by the NFC chip of the tablet eraser; and loading, by the driving circuit of the handwriting tablet in response to being illuminated by the preset light, an erasing voltage onto the erasing electrode of the handwriting tablet.

It should be understood that the general description above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

DETAILED DESCRIPTION

Figure 1:
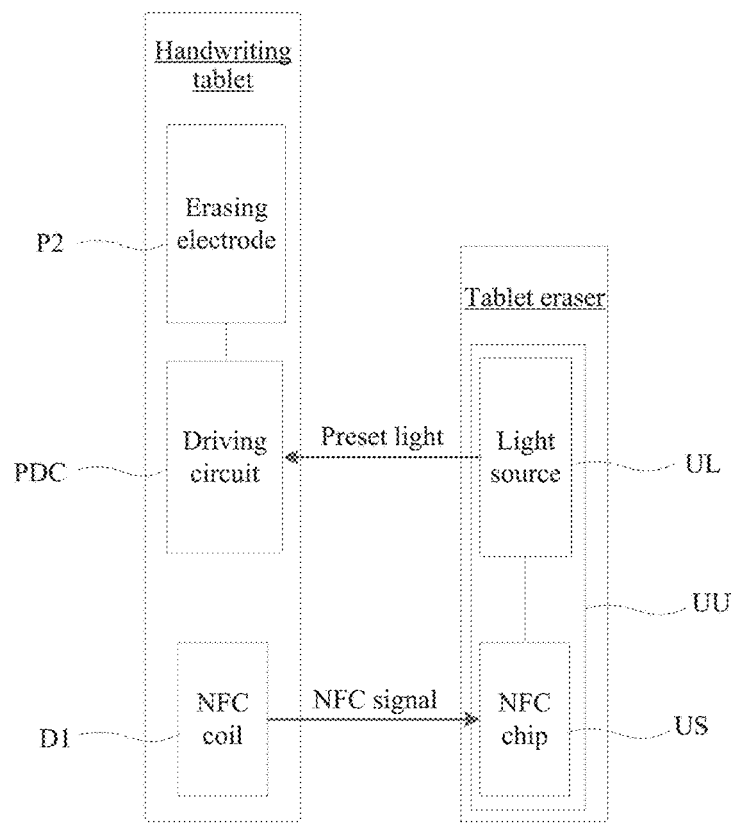
FIG. 1 is a schematic diagram of a principle of a handwriting tablet system according to embodiments of the present disclosure.

Example embodiments will now be described more fully with reference to the drawings. However, the example embodiments can be implemented in a variety of forms and should not be construed as being limited to the embodiments set forth herein. Rather, the provision of these embodiments makes the present disclosure comprehensive and complete and conveys ideas of the example embodiments in a comprehensive manner to those skilled in the art. The same reference numerals in the drawings indicate the same or similar structures, and thus their detailed description will be omitted. In addition, the drawings are only schematic illustrations of the present disclosure and are not necessarily drawn to scale.

Although relative terms such as "upper" and "lower" are used in this specification to describe a relative relationship of one component and another component, these terms are used in this specification only for convenience, for example, according to a direction of the example shown in the drawings. It will be appreciated that if the device illustrated is turned upside down, the component described as "upper" will become the "lower" component. When a certain structure is "on" another structure, it may mean that the certain structure is integrally formed on the other structure, or it may mean that the certain structure is "directly" arranged on the other structure, or that the certain structure is "indirectly" arranged on the other structure through yet another structure.

Terms "a", "an", "the", "said" and "at least one" are used to indicate presence of one or more elements/components/etc. Terms "include" and "comprise" are used to indicate an open-ended inclusion, and mean presence of additional elements/components/etc., in addition to listed elements/components/etc. Terms "first", "second", "third", etc., are used as markings only, instead of limiting the quantity of objects.

The present disclosure provides a handwriting tablet system and a method for erasing a pattern. Referring to FIG. 1, the handwriting tablet system includes a handwriting tablet and a tablet eraser. The handwriting tablet has a handwriting area, and the handwriting area is provided therein with a Near Field Communication (NFC) coil D1 for transmitting an NFC signal, as well as erasing electrodes P2 distributed in an array and a driving circuit PDC for driving erasing electrodes. The driving circuit is configured to load an erasing voltage onto the erasing electrode in response to the illumination of preset light. When the erasing electrode is loaded with the erasing voltage, a pattern at the position where the erasing electrode is located will be erased. The tablet eraser is provided with at least one erasing unit UU, each of which includes an NFC chip US and a light source UL. The erasing unit is configured to emit the preset light from the light source when an NFC signal is sensed by the NFC chip. When the NFC signal is not sensed by the NFC chip, the light source does not emit light.

Figure 20:
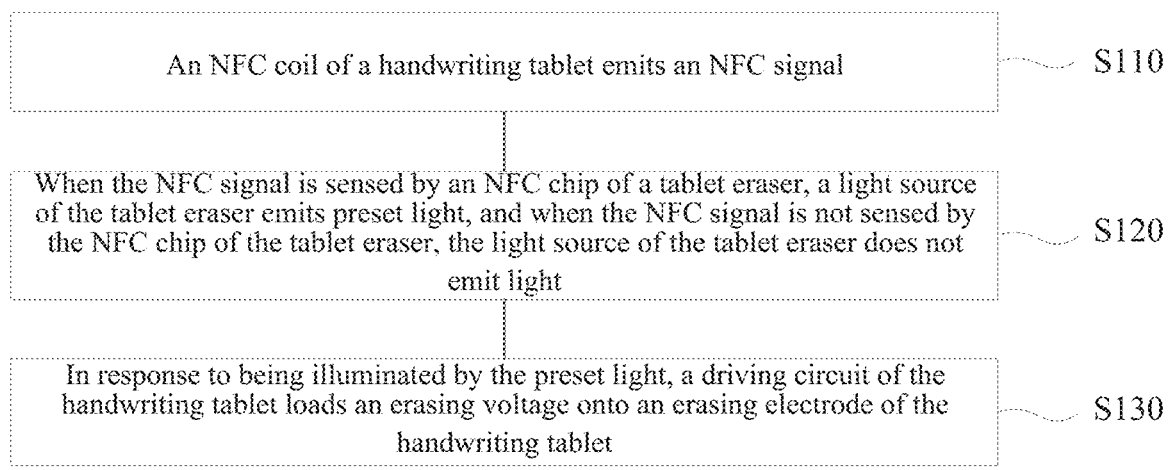
FIG. 20 is a schematic flowchart of a method for erasing a pattern according to embodiments of the present disclosure.

The handwriting tablet system can apply the method for erasing a pattern shown in steps S110 to S130, as shown in FIG. 20, to erase the pattern in a local area of the handwriting tablet.

In step S110, an NFC coil of a handwriting tablet emits an NFC signal.

In step S120, when the NFC signal is sensed by an NFC chip of a tablet eraser, a light source of the tablet eraser emits preset light, and when the NFC signal is not sensed by the NFC chip of the tablet eraser, the light source of the tablet eraser does not emit light.

In step S130, in response to being illuminated by the preset light, a driving circuit of the handwriting tablet loads an erasing voltage onto an erasing electrode of the handwriting tablet.

As a result, when the tablet eraser approaches the handwriting tablet and enters a sensing range of the NFC coil, the NFC chip in the tablet eraser can sense the NFC signal, which in turn causes the light source to emit light to erase the pattern on the handwriting tablet. When the tablet eraser moves away from the handwriting tablet and leaves the sensing range of the NFC coil, the NFC chip in the tablet eraser is unable to sense the NFC signal, which causes the light source not to emit light. In this way, the light source of the tablet eraser can be turned off in a timely manner. On the one hand, the power consumption of the tablet eraser can be reduced. On the other hand, shining on the user's eye due to turning-off of the light source not in a timely manner can be prevented. At the same time, the goal of reducing the power consumption and improving the safety can be achieved. Moreover, since the tablet eraser emits light when approaching the handwriting tablet and turns off the power in a timely manner when moving away from the handwriting tablet, a situation where the pattern on the handwriting tablet is wrongly erased due to the tablet eraser emitting light when the tablet eraser is located far from the handwriting tablet can be avoided, thereby improving the accuracy of the pattern erasing.

Figure 2:
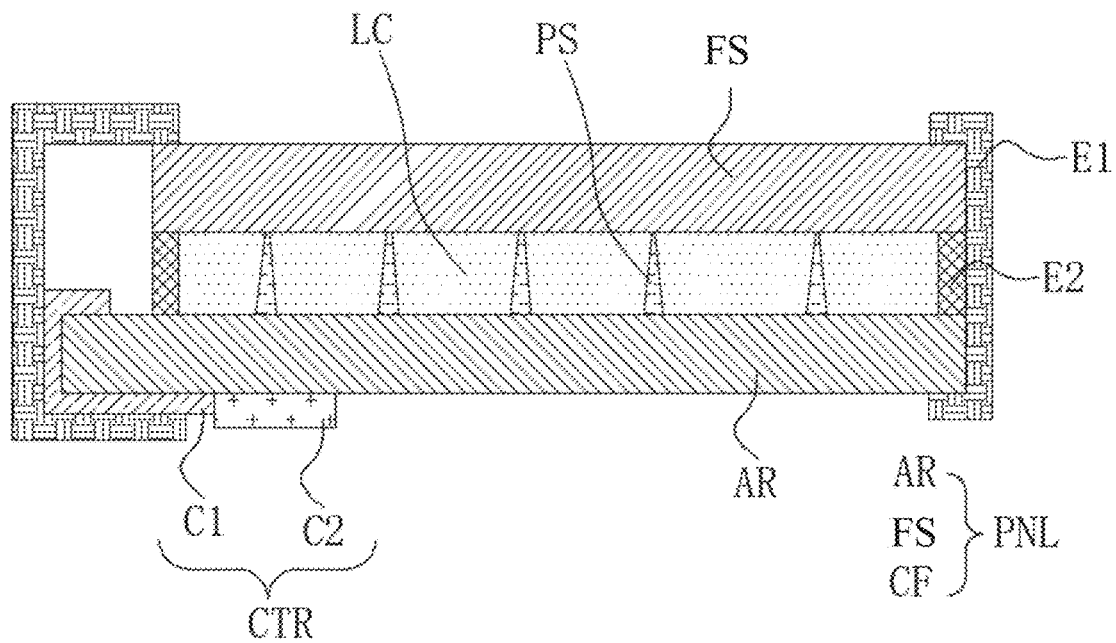
FIG. 2 is a schematic diagram of a structure of a handwriting tablet according to embodiments of the present disclosure.
Figure 3:
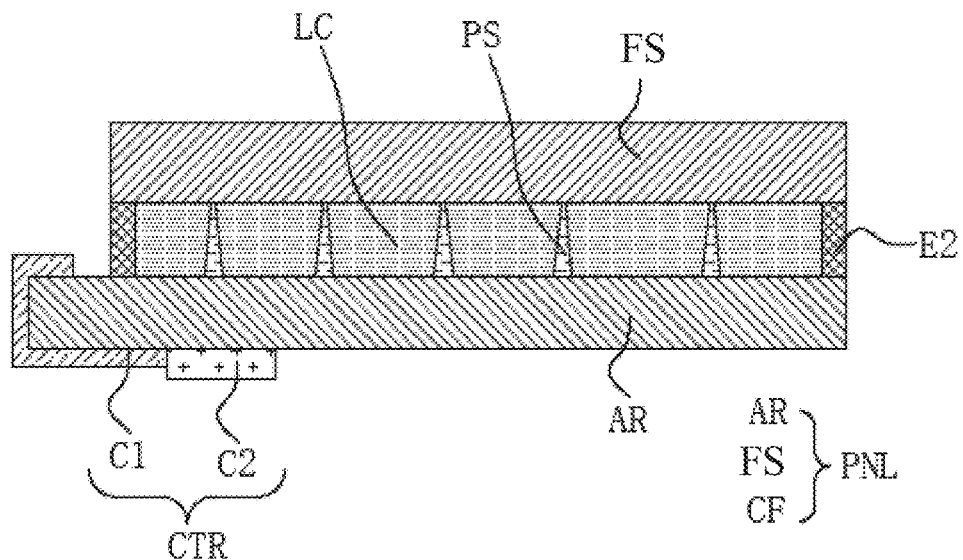
FIG. 3 is a schematic diagram of a structure of a handwriting tablet according to embodiments of the present disclosure.

Referring to FIGS. 2 and 3, the handwriting tablet disclosed in the present disclosure can include a handwriting tablet panel PNL and a control module CTR for controlling the handwriting tablet panel PNL. The handwriting tablet panel PNL can include an array substrate AR, a liquid crystal layer LC, and a cover plate CF arranged in stacked manner in sequence.

In some embodiments, the liquid crystal in the liquid crystal layer LC can have bistable state characteristic, especially can be the bistable cholesteric liquid crystal. In a non-writing state, the cholesteric liquid crystal exhibits a focal cone texture, which scatters the ambient light weakly, resulting in a base color (such as dark color) is presented on the handwriting tablet. When writing with a writing pen or pencil, the pressure causes the cholesteric liquid crystal to transform from the focal cone texture to a planar texture, which can selectively reflect visible light and present a specific color (such as yellow-green), thereby displaying the corresponding written content.

Figure 4:
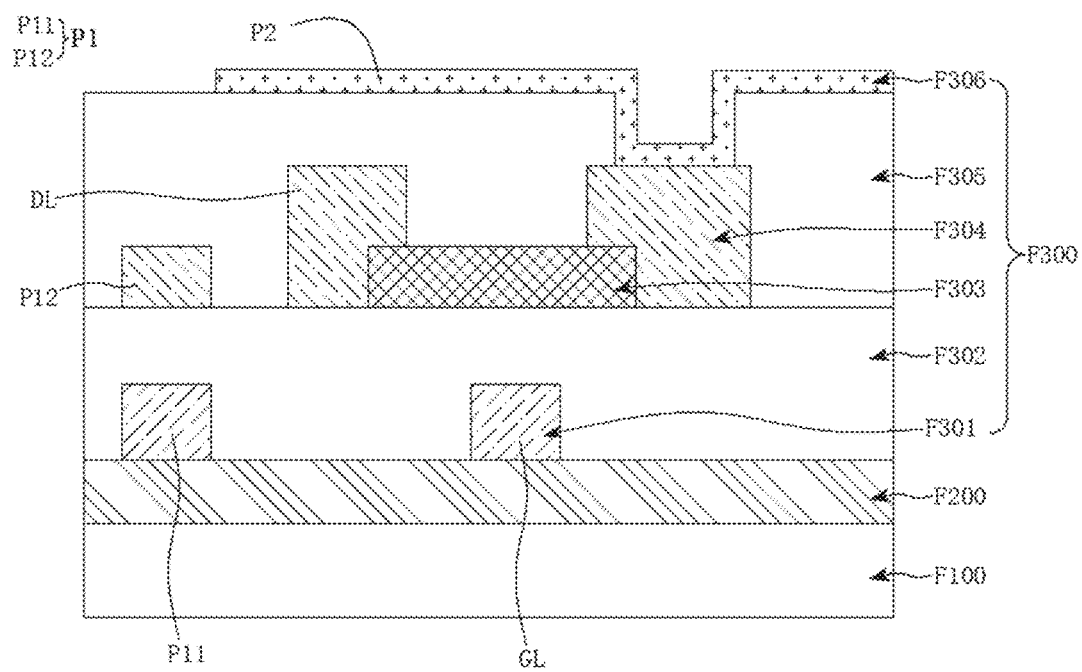
FIG. 4 is a schematic diagram of a structure of an array substrate according to embodiments of the present disclosure.
Figure 5:
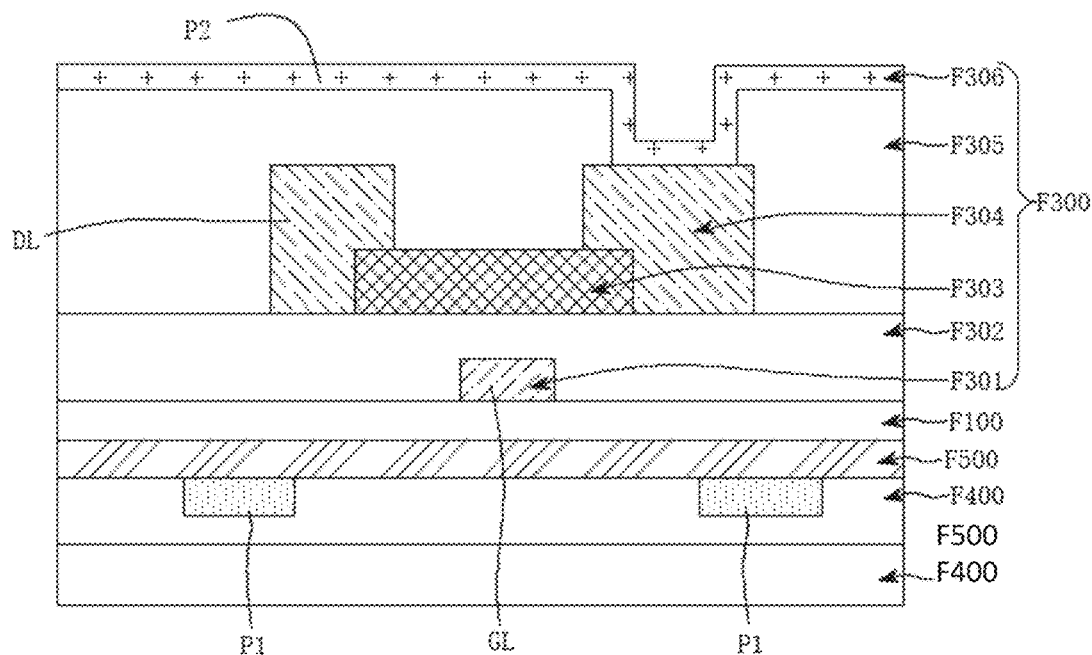
FIG. 5 is a schematic diagram of a structure of an array substrate according to embodiments of the present disclosure.

Referring to FIGS. 4 and 5, the array substrate AR can be provided with an erasing electrode P2 and a driving circuit for driving the erasing electrode P2. The cover plate CF is provided with a common electrode layer (not shown in the drawings). The liquid crystal layer LC is sandwiched between the erasing electrode P2 and the common electrode layer. When an erasing voltage is applied to the erasing electrode P2 and the common electrode layer, an electric field between the erasing electrode P2 and the common electrode layer can restore the liquid crystal to the focal cone texture, achieving the effect of erasing the written content.

In some embodiments, the cover plate CF can include a flexible substrate, and the common electrode layer is arranged on a side of the flexible substrate close to the liquid crystal layer LC. In this way, when being pressed, the cover plate CF can deform to squeeze the liquid crystal, thereby transforming the liquid crystal into the planar texture and achieving writing on the handwriting tablet.

In some embodiments, the cover plate CF can further have an orientation layer located on a side (inner side) of the common electrode layer away from the flexible substrate.

In some embodiments, the handwriting tablet panel PNL can further include a photo spacer PS located between the array substrate AR and the cover plate CF to facilitate maintaining a thickness of a liquid crystal cell. The photo spacer PS can be a silicon ball, a plastic ball, a resin ball, etc., as well as a resin column, a resin protrusion, etc. preformed on the array substrate AR or the cover plate CF.

Referring to FIGS. 2 and 3, the handwriting tablet panel PNL can further include a sealing glue E2 located between the array substrate AR and the cover plate CF. The sealing glue can be arranged around a handwriting area AA of the handwriting tablet panel PNL to seal the liquid crystal layer LC and to connect the array substrate AR to the cover plate CF.

Figure 8:
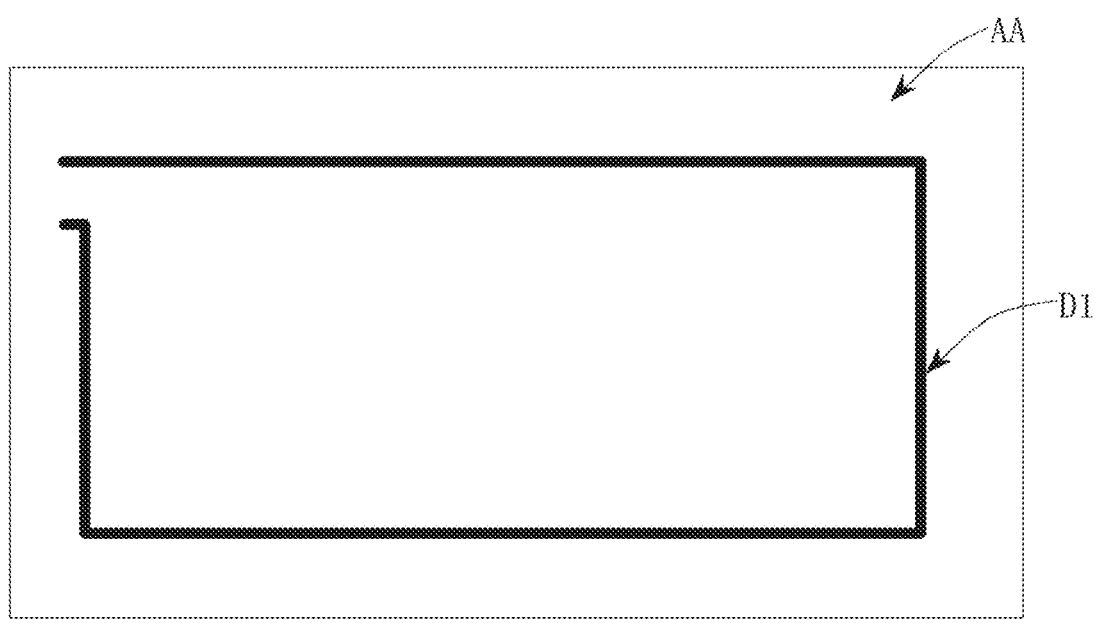
FIG. 8 is a schematic diagram of a distribution of an NFC coil according to embodiments of the present disclosure.
Figure 9:
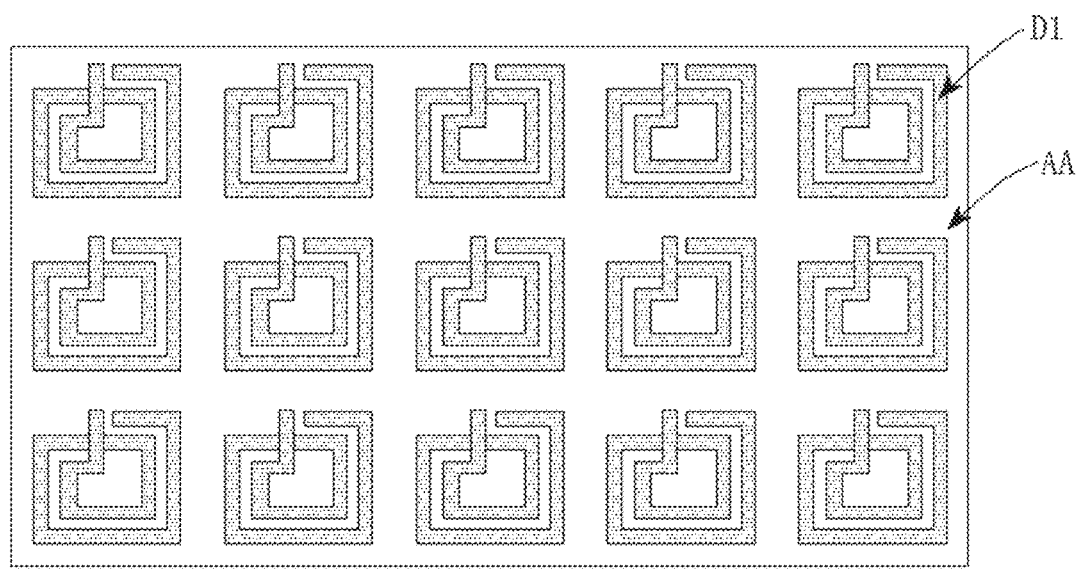
FIG. 9 is a schematic diagram of a distribution of an NFC coil according to embodiments of the present disclosure.

Referring to FIGS. 8 and 9, the array substrate AR has a handwriting area AA and a peripheral area surrounding the handwriting area AA. Within the handwriting area AA, a written pattern can be formed by pressing (e.g. through fingers or pens). The array substrate can also be provided with NFC coils for emitting NFC signals. The NFC coils cover the handwriting area AA. In this way, the NFC signals can cover any position in the handwriting area AA of the handwriting tablet disclosed in the present disclosure. When the tablet eraser approaches the handwriting tablet to let the NFC chip enter the sensing range of the NFC coil, the NFC chip can receive the NFC signal, and the light source can emit light to illuminate the handwriting area, thereby allowing the driving circuit of the handwriting area to apply the erasing voltage to the erasing electrode, achieving erasing of the pattern in the handwriting area. When the tablet eraser moves away from the handwriting tablet, the NFC chip is unable to receive the NFC signal, and the light source does not emit light at this time.

Figure 6:
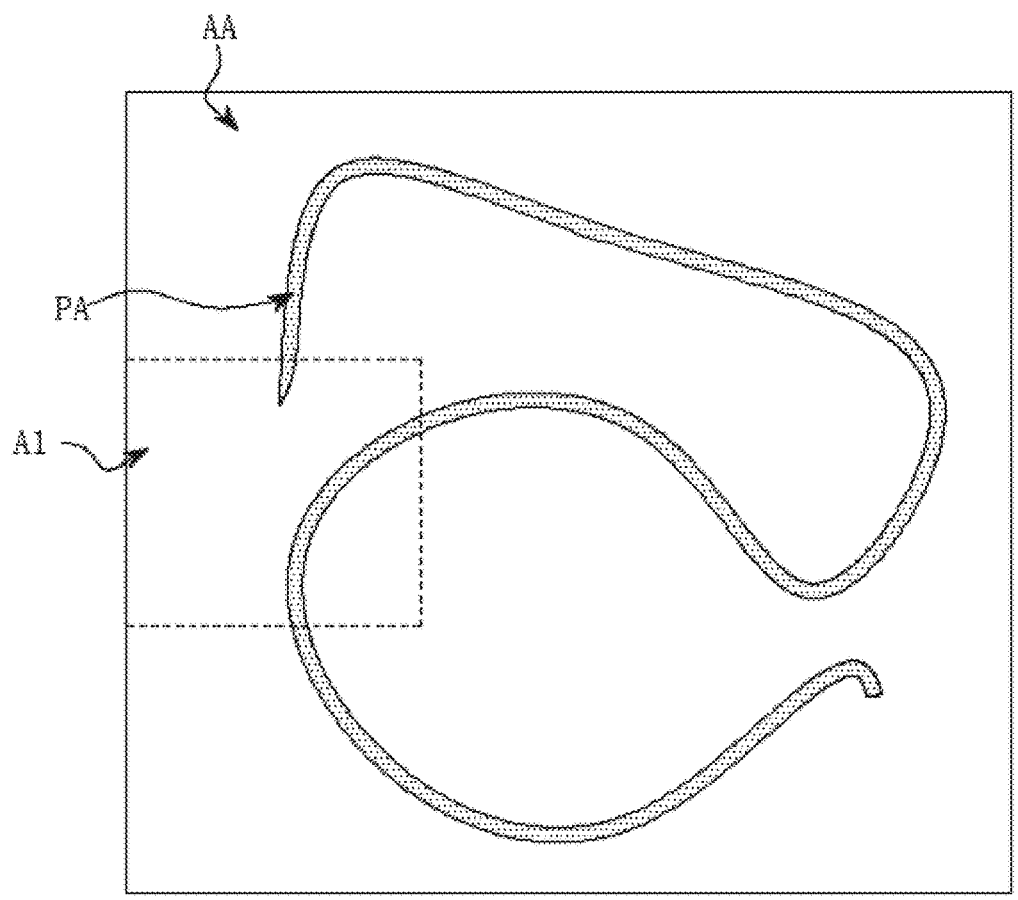
FIG. 6 is a schematic diagram of writing a pattern on a handwriting tablet according to embodiments of the present disclosure.

Referring to FIG. 6, when users need to write contents on the handwriting tablet, they can press the handwriting tablet with their fingers, writing pens, etc. The liquid crystal in the area where the handwriting tablet is pressed transforms into the flat texture, which reflects a specific color, forming written trajectories and presenting the written content PA.

Figure 7:
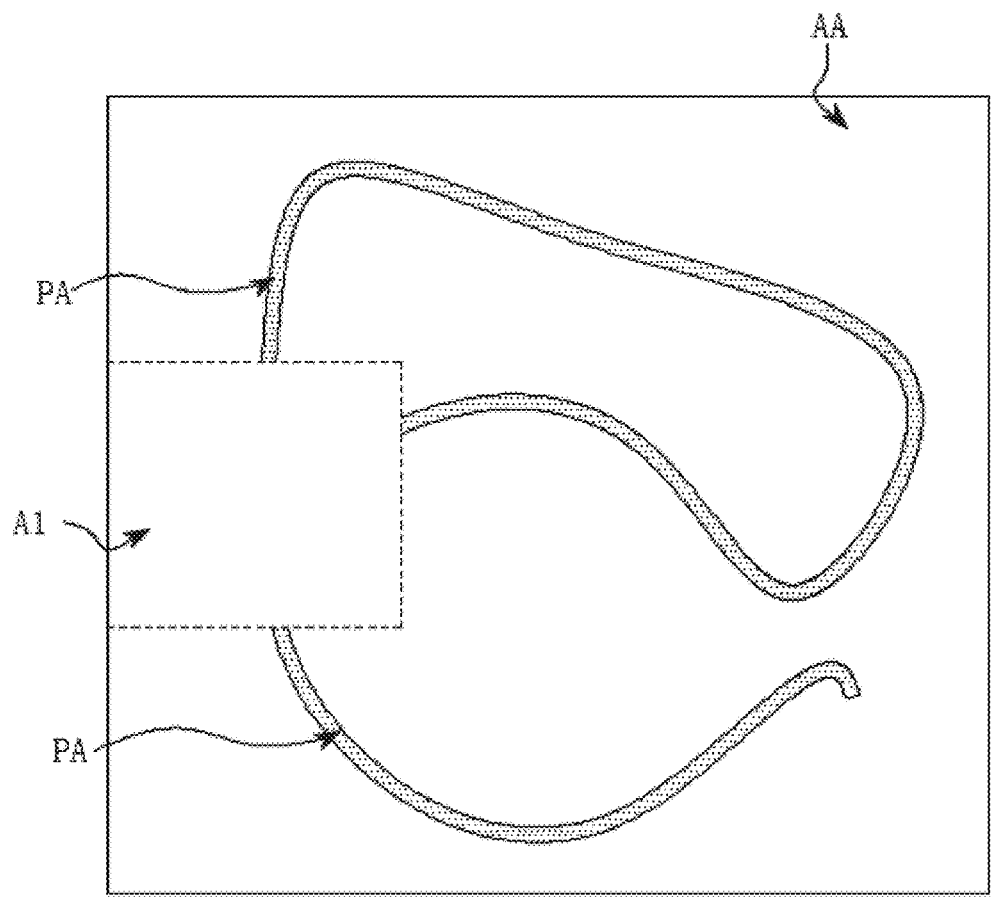
FIG. 7 is a schematic diagram of erasing a local pattern on a handwriting tablet according to embodiments of the present disclosure.

Referring to FIGS. 6 and 7, when the written content in a specific area A1 needs to be erased, the tablet eraser can be taken close to the specific area A1. When a distance between the tablet eraser and the specific area A1 is close enough for the NFC chip to receive the NFC signal, the light source on the tablet eraser emits light and illuminates the specific area A1, causing the driving circuit in the specific area A1 to apply the erasing voltage to the erasing electrode. In the specific region A1, the electric field between the erasing electrode and the common electrode causes the liquid crystal in specific region A1 to transform into the focal cone texture, thereby changing from a reflecting state to a scattering state, allowing the specific region A1 to present the base color, with the written content in the specific region A1 being erased. After the erasing of the pattern to be erased is completed, the tablet eraser can be moved away. At this point, the NFC chip in the tablet eraser gets out of the sensing range of the NFC coil, and is unable to receive the NFC signal, allowing the light source to be turned off in a timely manner. In this way, both the situations where the light source is turned on too early and turned off too late can be avoided, thereby preventing the light source from accidentally illuminating on other areas, preventing the patterns in the other areas from being accidentally erased, and improving the accuracy of erasing.

In the present disclosure, the NFC coil can be one NFC coil or multiple NFC coils, as long as the NFC coil can cover the handwriting area.

For example, in some embodiments, as shown in FIG. 8, one NFC coil D1 is provided, and a distribution range of the NFC coil covers the handwriting area AA, so that each position in the handwriting area has an NFC signal.

For example, in some embodiments, as shown in FIG. 9, multiple NFC coils D1 are provided within the handwriting area AA. The sensing ranges for NFC signals sent by each NFC coil D1 cover the entire handwriting area AA.

Referring to FIGS. 4 and 5, the array substrate AR can include a base substrate F100, a base layer F200, and a driving layer F300 arranged in stacked manner. The base layer F200 is arranged on a side of the driving layer F300 close to the base substrate F100. In some embodiments, the base layer F200 may be arranged between the driving layer F300 and the base substrate F100. In some embodiments, the base layer F200 can be arranged on a side of the base substrate F100 away from the driving layer F300. For example, a base film serving as the base layer F200 can be attached to a back surface of the base substrate F100 (on a side of the base substrate F100 away from the driving layer F300).

The base substrate F100 can be a base substrate F100 made of an inorganic material or an organic material. For example, in some embodiments, the material of the base substrate F100 can be glass materials such as sodium lime glass, quartz glass, sapphire glass, or metal materials such as stainless steel, aluminum, nickel, etc. In some embodiments, the material of the base substrate F100 can be polymethyl methacrylate (PMMA), polyvinyl phenol (PVP), polyether sulfone (PES), polyimide, polyamide, acetal, polycarbonate (PC), polyethylene terephthalate (PET), polyethylene naphthalate (PEN), or combinations thereof. In some embodiments, the base substrate F100 can also be a flexible base substrate F100, for example, the material of the base substrate F100 can be polyimide (PI). The base substrate F100 can also be a composite of multiple layers of materials. For example, in some embodiments, the base substrate F100 can include a bottom film layer, a pressure-sensitive adhesive layer, a first polyimide layer, and a second polyimide layer arranged in stacked manner in sequence.

In some embodiments, the base layer F200 can be a film layer having high absorption to reduce reflection of light, thereby allowing the base layer F200 to present dark color, such as black or dark blue. In this way, the base color of the handwriting tablet can be dark color. For example, the base layer F200 can be a black resin layer or a black plastic layer.

In the present disclosure, the erasing electrode P2 and the driving circuit PDC can be arranged in the driving layer. In some embodiments, the driving circuit can include a photosensitive switching element, with one end of the photosensitive switching element being electrically connected to the erasing electrode. Under the illumination of the light, the switching element can be turned on to apply the erasing voltage to the erasing electrode. In some embodiments, the switching element can be a thin film transistor, and a drain of each thin film transistor is electrically connected with each erasing electrode in one-to-one correspondence. When a gate of the thin film transistor is loaded with a cutoff voltage, the thin film transistor is in a cutoff state. If there is no preset light (such as light in a preset wavelength range)

illuminating on a channel region of the thin film transistor, the thin film transistor will have a small leakage current in the cutoff state. When the preset light illuminates on the channel region of the thin film transistor, the leakage current of the thin film transistor will significantly increase until the thin film transistor is turned on.

Figure 10:
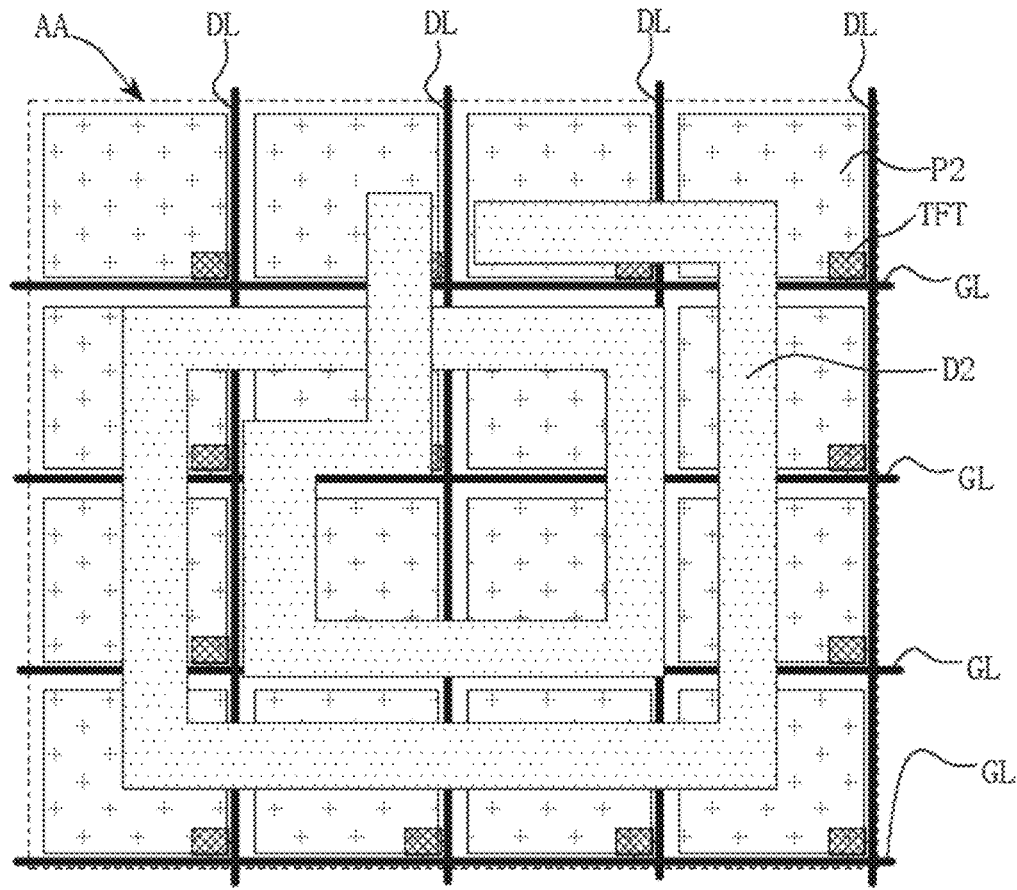
FIG. 10 is a schematic diagram of a distribution of an NFC coil according to embodiments of the present disclosure.

Referring to FIGS. 4, 5, and 10, the driving layer can also be provided with a gate line GL extending along a row direction and a power line DL extending along a column direction. A gate of the thin film transistor TFT is connected to the gate line GL, a drain of the thin film transistor TFT is connected to the erasing electrode P2, and a source of the thin film transistor TFT is connected to the power line DL. When the thin film transistor is in the cutoff state, if a channel region of the thin film transistor is not illuminated (preset light), the thin film transistor will have a small leakage current, which allows the voltage on the erasing electrode to be well maintained, and the erasing voltage cannot be loaded onto the erasing electrode. When light illuminates in the channel region of the thin film transistor, the leakage current of the thin film transistor increases sharply, which allows the erasing voltage to be loaded onto the erasing electrode through the thin film transistor.

In some embodiments of the present disclosure, the handwriting tablet can also detect whether the tablet eraser is away from the handwriting area AA. When the handwriting tablet detects that the tablet eraser is away from the handwriting area, a reset voltage can be loaded onto the erasing electrode P2 by controlling the driving circuit PDC, thereby eliminating the erasing voltage that is possibly loaded onto the erasing electrode, and allowing the handwriting tablet to be in a rewritable state at the erasing electrode. The reset voltage loaded onto the erasing electrode cannot affect the morphology of the liquid crystal. As an example, the reset voltage can be consistent with a common voltage on the common electrode. In some embodiments of the present disclosure, the NFC coil on the handwriting tablet can be used to detect whether the tablet eraser has left. When the tablet eraser with an NFC chip leaves a sensing range of the NFC coil, the signal on the NFC coil will change. Based on the change in the signal on the NFC coil, it can be determined whether the NFC coil has left.

In some embodiments, the handwriting tablet can have two different operating modes, namely a display mode and a reset mode. In the display mode, the gate line can load the cutoff voltage onto the gate of the thin film transistor, and the power line can load a preset voltage signal onto the source of the thin film transistor, for example, loading a stable erasing voltage or alternately loading the erasing voltage and the reset voltage. When the tablet eraser illuminates, in response to the NFC signal, the handwriting area with light, the leakage current of the illuminated thin film transistor increases, which in turn loads the preset voltage signal on the power line onto the erasing electrode driven by the thin film transistor. In the process of loading the voltage onto the erasing electrode, as long as the erasing voltage had been loaded onto the erasing electrode ever, the pattern in the area above the erasing electrode can be eliminated. It can be understood that when the preset voltage signal is a stable erasing voltage, the voltage on the erasing electrode driven by the illuminated thin film transistor after the light elimination is the erasing voltage. When the preset voltage signal is alternately loaded erasing voltage and reset voltage, the voltage on the erasing electrode driven by the illuminated thin film transistor after the light elimination is the erasing voltage or the reset voltage. When the handwriting tablet detects that the tablet eraser is away, for example, when the light disappears or the signal of the NFC coil changes, the handwriting tablet can enter a preset reset mode for a preset time period, and enter the display mode again after the reset mode. In the reset mode, the gate line can load a turned-on voltage onto the gate of the thin film transistor, and the power line can load the reset voltage onto the source of the thin film transistor. In this way, the erasing electrode can be loaded with the reset voltage in the reset mode and maintain the reset voltage to enter the display mode. In this way, when the handwriting tablet enters the display mode again, patterns can be written again in various parts of the handwriting area. It can be understood that in the reset mode, each erasing electrode can be reset simultaneously, or each erasing electrode can be reset row by row through progressive scanning, which is not limited in the present disclosure.

Where the driving circuit is a thin film transistor is taken as an example, an exemplary introduction and explanation of the structure of the driving layer will be provided. It can be understood that embodiments are only one of feasible ways for the driving layer disclosed in the present disclosure, and other feasible ways can also be used, to achieve controlling of the erasing electrode.

In some embodiments, the driving layer can include a transistor layer and an erasing electrode layer arranged in stacked manner. In some embodiments, the transistor layer is located between the erasing electrode layer and the base substrate. The erasing electrode is arranged in the erasing electrode layer, and the transistor layer includes a thin film transistor electrically connected to each erasing electrode in one-to-one correspondence. The thin film transistor can be selected from a top gate thin film transistor, a bottom gate thin film transistor, or a double gate thin film transistor. A material of an active layer of the thin film transistor can be amorphous silicon semiconductor materials, low-temperature polycrystalline silicon semiconductor materials, metal oxide semiconductor materials, organic semiconductor materials, or other types of semiconductor materials. The thin film transistor can be either N-type thin film transistors or P-type thin film transistors. The transistor can have a source, a drain, and a gate. It can be understood that the source and the drain of the transistor are two relative and interchangeable concepts. When the operating state of the transistor changes, for example, when a direction of a current changes, the source and the drain of the transistor can be interchanged.

In some embodiments, referring to FIGS. 4 and 5, the transistor layer can include a gate layer F301, a gate insulation layer F302, a semiconductor layer F303, and a source-drain metal layer F304, etc. arranged in stacked manner between the base color layer F200 and the erasing electrode layer F306. The position relationship between film layers can be determined based on the film structure of the thin film transistor. In some embodiments, the active layer of the thin film transistor can be formed in the semiconductor layer F303. The gate layer wiring such as the gate line GL, and the gate of the thin film transistor can be formed in the gate layer F301. The source-drain metal layer wiring such as the power line DL can be formed in the source-drain metal layer F304.

In some embodiments of the present disclosure, the driving layer F300 can further include a passivation layer F305, which can be arranged on a surface of the source-drain metal layer F304 away from the base substrate F100, to protect the source-drain metal layer F304.

In the present disclosure, a structure layer A is located on a side of a structure layer B away from the base substrate, which can be understood as, the structure layer A is formed on a side of the structure layer B away from the base substrate. When structure layer B is a patterned structure, a portion of a structure of the structure layer A can also be located at the same physical height as the structure layer B or at lower physical height than structure layer B, where the base substrate is a height reference.

In some embodiments of the present disclosure, the driving layer F300 can further include a planarization layer located between the source-drain metal layer F304 and the erasing electrode layer F306, which can provide a planarized surface for the erasing electrode P2. In some embodiments, a material of the planarization layer can be organic materials.

In some embodiments of the present disclosure, the driving layer F300 can further include an interlayer dielectric layer. The interlayer dielectric layer is located on a side where a film layer such as the semiconductor layer, the gate layer, etc. away from the base substrate, and the source-drain metal layer F304 is located on a side of the interlayer dielectric layer away from the base substrate.

In some embodiments, as shown in FIGS. 4 and 5, the driving layer F300 can include a gate layer F301, a gate insulation layer 302, a semiconductor layer F303, a source-drain metal layer F304, a passivation layer F305, and an erasing electrode layer F306. The thin film transistor formed in this way is a bottom gate type thin film transistor.

In some embodiments of the present disclosure, a material of the erasing electrode layer F306 can be a transparent material, that is, the erasing electrode P2 can be a transparent electrode, which can reduce the reflection of the erasing electrode and facilitate clearly displaying of the pattern. In some embodiments of the present disclosure, the material of the erasing electrode layer can be a metal oxide, such as ITO (indium tin oxide).

In the array substrate provided in the present disclosure, the NFC coil can be integrated into the driving layer, or a sensing layer with the NFC coil can be arranged on a side of the driving layer close to the base substrate. For example, a sensing layer F400 with an NFC coil is arranged on a side of the base substrate F100 away from the driving layer F300, or a sensing layer with an NFC coil is arranged between the base substrate and the driving layer. In some embodiments of the present disclosure, when the sensing layer F400 is arranged on a side of the base color layer F200 close to the driving layer F300, an anti-reflective layer F500 can also be arranged on a side of the sensing layer F400 away from the base color layer F200, to reduce the reflection of the NFC coil and improve the display effect of the handwriting tablet.

In some embodiments of the present disclosure, the NFC coil D1 can be arranged in the driving layer F300. In other words, the NFC coil D1 can share a metal layer with the driving layer F300, especially can be prepared in a common process.

In some embodiments of the present disclosure, as shown in FIG. 4, the driving layer F300 is provided with an erasing electrode P2 and a thin film transistor TFT driving the erasing electrode P2 (as a driving circuit). In some embodiments, the driving layer F300 has a gate layer F301 and a source-drain metal layer F304. The gate line GL connected to the thin film transistor TFT can be arranged in the gate layer F301 and extend along the row direction, while the power line DL connected to the thin film transistor TFT can be arranged at SD and extend along the column direction. In some embodiments, the NFC coil D1 can be composed of multiple sub-electrodes P1, with some sub-electrodes arranged in the gate layer F301 and/or some electrodes arranged in the source-drain metal layer F304. In some embodiments, some sub-electrodes (such as P11 in FIG. 4) are arranged in the gate layer F301, and some electrodes (such as P12 in FIG. 4) are arranged in the source-drain metal layer F304. In this way, the NFC coil D1 can be bridged between the gate layer F301 and the source-drain metal layer F304, allowing for wiring without affecting the gate line GL and the power line DL.

Figure 11:
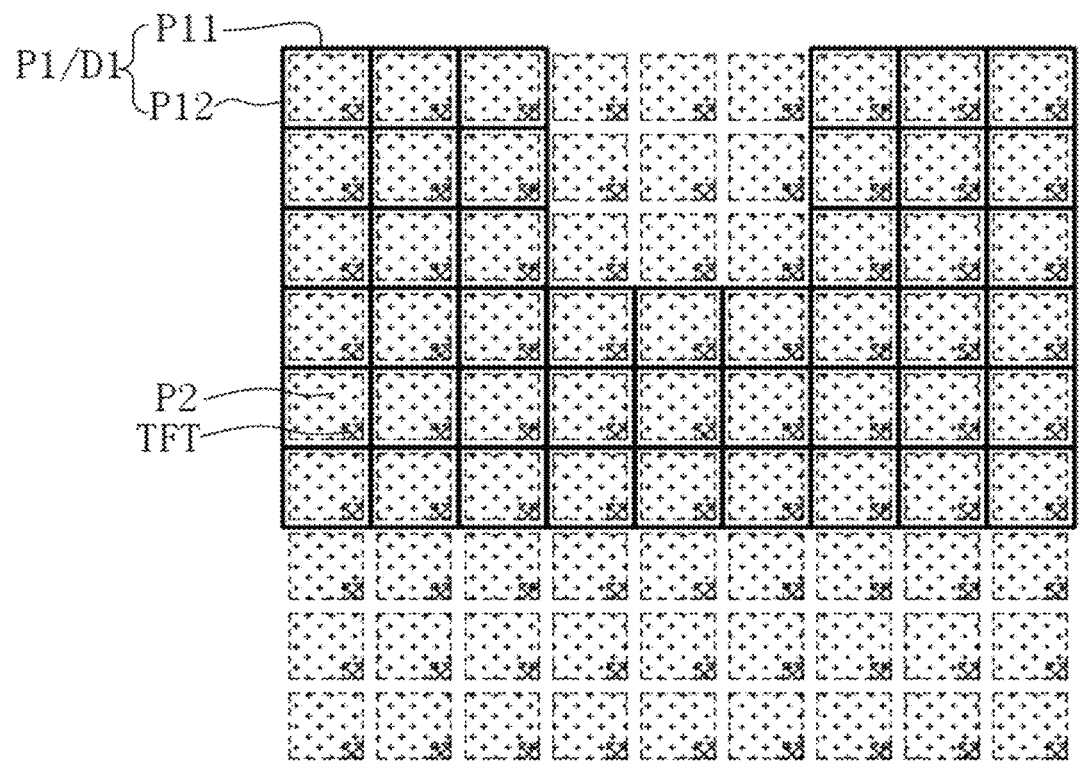
FIG. 11 is a schematic diagram of a distribution of an NFC coil according to embodiments of the present disclosure.

In some embodiments, referring to FIG. 11, the NFC coil D1 can also be arranged in the gap between the erasing electrodes P2, without overlapping with the erasing electrode P2, to avoid signal shielding of the NFC coil by the erasing electrode. That is, the sub-electrode P1 can be arranged between the erasing electrodes P2. An orthographic projection of the sub-electrode P1 on the base substrate is located between orthographic projections of erasing electrodes P2 on the base substrate. In the present disclosure, when describing that a structure A overlaps with a structure B, it refers to that structure A and structure B are located in different film layers, and an orthographic projection of structure A on the base substrate at least partially overlaps with an orthographic projection of structure B on the base substrate.

In some embodiments, as shown in FIG. 11, the sub-electrode P1 includes a row sub-electrode P11 extending along the row direction and a column sub-electrode P12 extending along the column direction. The row sub-electrode P11 is located in the gate layer F301, and the column sub-electrode P12 is located in the source-drain metal layer. The row sub-electrode P11 and the column sub-electrode P12 are connected through a via hole.

In some embodiments of the present disclosure, as shown in FIG. 5, the array substrate AR can further include a sensing layer F400 for arranging the NFC coil D1. The sensing layer F400 is provided with one or multiple conductive layers, and the wiring of the NFC coil D1 can be formed through these conductive layers.

The sensing layer F400 can be arranged on a side of the base substrate F100 away from the base color layer F200, or arranged between the base substrate F100 and the base color layer F200, or arranged between the driving layer F300 and the base color layer F200. In some embodiments, as shown in FIG. 5, an anti-reflective layer F500 can also be arranged on a side of the sensing layer F400 close to the driving layer F300, to reduce the reflectivity of the NFC coil D1 in the sensing layer F400 and thereby improving the display effect.

In some embodiments of the present disclosure, the anti-reflective layer F500 (anti-reflective film) and the sensing layer F400 (NFC patch) can be sequentially attached on the side of the base substrate F100 away from the driving layer F300. The sensing layer F400 can be a thin film with an NFC coil D1.

In some embodiments, the NFC coil D1 can use both hollow wiring and non-hollow wiring. In some embodiments, the wiring of the NFC coil D1 is non-hollow wiring.

In some embodiments, as shown in FIG. 10, a width of the wiring of the NFC coil D1 can be greater than the gap between the erasing electrodes P2. In other words, the wiring of the NFC coil D1 can overlap at least partially with the erasing electrode P2. Due to the fact that the NFC coil D1 is located below the driving layer F300 (on a side close to the base substrate F100), the wiring of the NFC coil D1 has a large area and overlaps with the erasing electrode P2, both of which will not interfere with the erasing electrode P2.

Figure 12:
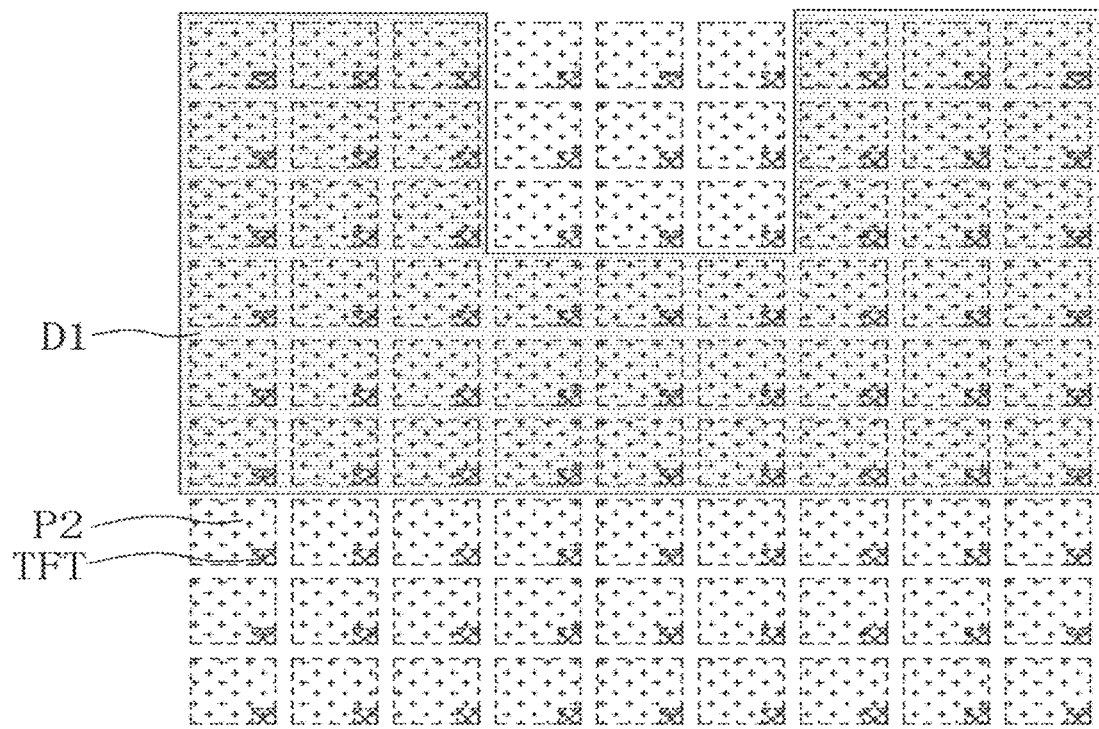
FIG. 12 is a schematic diagram of a distribution of an NFC coil according to embodiments of the present disclosure.

In some embodiments, as shown in FIG. 12, on the plane parallel to the base substrate, the width of the NFC coil D1 is greater than the size of the erasing electrode P2.

Figure 13:
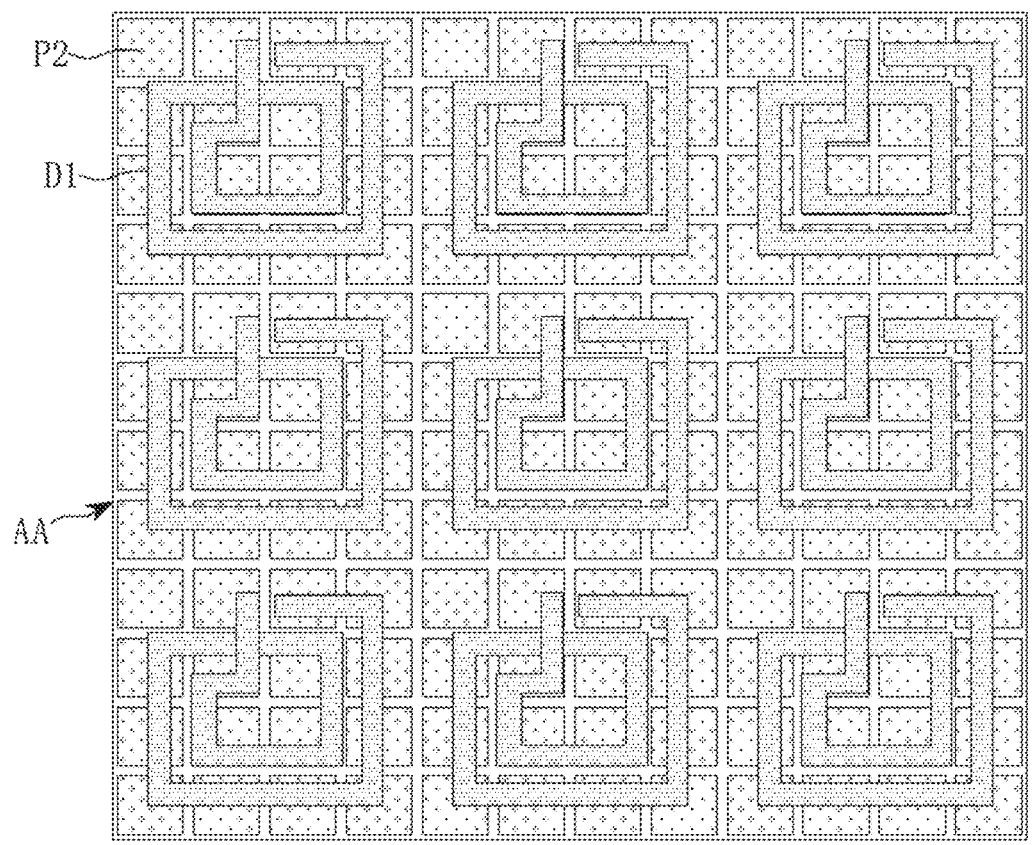
FIG. 13 is a schematic diagram of a distribution of an NFC coil according to embodiments of the present disclosure.

In some embodiments, as shown in FIG. 13, on the plane parallel to the base substrate, the width of the wiring of the NFC coil D1 is greater than the width of the gap between the erasing electrodes P2, and not greater than the width of the erasing electrode P2.

In some embodiments of the present disclosure, as shown in FIG. 10, the orthographic projection of the wiring of the NFC coil on the base substrate has an overlapped position. The overlapped position of the orthographic projection of the wiring of the NFC coil is located within the orthographic projection of the erasing electrode on the base substrate. The overlapped position of the orthographic projection of the wiring of the NFC coil is bridged through the driving layer. In other words, the NFC coil D1 includes at least one turn of wiring. The overlapped position of the wiring of the NFC coil D1 overlaps with the erasing electrode P2. At the overlapped position of the wiring of the NFC coil, the wiring of the NFC coil D1 is bridged through the driving layer F300. In some embodiments of the present disclosure, the sensing layer F400 can further include multiple conductive layers, and the wiring of the NFC coil D1 is bridged between the multiple conductive layers of the sensing layer F400.

In the present disclosure, when multiple NFC coils are arranged, the patterns of each of the NFC coils D1 can be not exactly the same. For example, there can be differences in the number of turns, width, wiring length, etc. of the NFC coil D1. In some embodiments, the pattern of the NFC coil D1 can be adjusted to ensure that sensing distances of each of the NFC coils D1 are the same or basically the same. In some embodiments of the present disclosure, a sensing distance of the NFC coil D1 does not exceed 10 cm, for example, does not exceed 5 cm, especially between 0-3 cm, so that the safety of the tablet eraser can be ensured.

In some embodiments of the present disclosure, a control module CTR can include a circuit distribution structure C1 and a control unit C2. The circuit distribution structure C1 is electrically connected to the driving circuit and the NFC chip, and is also electrically connected to the control unit, to enable interaction between the control unit C2 and the driving circuit as well as the NFC chip. In some embodiments, the circuit distribution structure can include a circuit board or a flexible circuit board, or it can be a flexible film with wiring arranged thereon. The control unit can control the NFC coil D1 to send NFC signals or detect changes in NFC signals, and can also be used to control the operating state of the driving circuit. In some embodiments, the control unit can also play other roles according to the functional requirements of the handwriting tablet, such as one-click clearing, screen saving, etc. The present disclosure does not put special limitations on this. The control unit can include a printed circuit board, a chip, a microcontroller, a microprocessor, or other circuits that can achieve control functions, which are connected to the circuit distribution structure.

Figure 14:
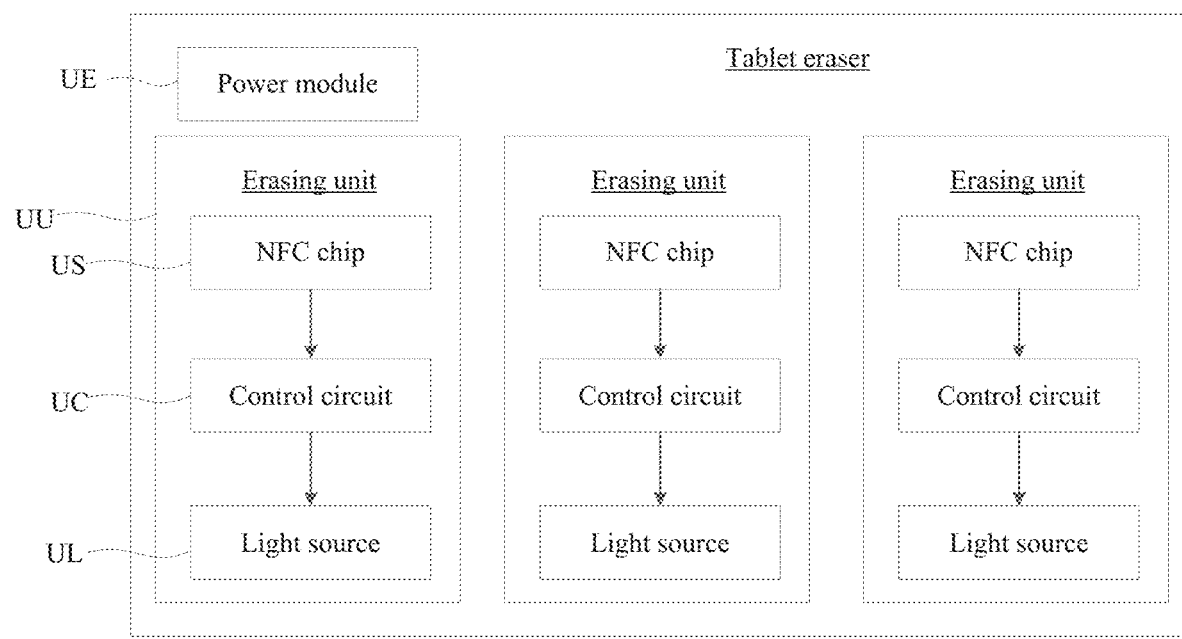
FIG. 14 is a schematic diagram of a structure of a tablet eraser according to embodiments of the present disclosure.

Referring to FIG. 14, the tablet eraser in the present disclosure is provided with at least one erasing unit UU. The erasing unit UU includes a light source UL and an NFC chip US. When the light source UL emits light, it can emit light of a preset wavelength and intensity, and a spectral range and intensity of the preset light can be determined based on the characteristics of the driving circuit.

In some embodiments of the present disclosure, the erasing unit UU further includes a control circuit UC. The control circuit UC is electrically connected to the NFC chip US and the light source UL. The control circuit is configured to control the light source UL to emit light when the NFC signal is sensed by the NFC chip US, and to control the light source UL not to emit light when the NFC signal is not sensed by the NFC chip US.

In some embodiments, the NFC chip US is configured to output a continuous startup signal to the control circuit UC when an NFC signal is sensed, until the NFC signal cannot be sensed any more. The control circuit UC is configured to load a power voltage onto the light source UL to let the light source emit light, when the NFC chip US outputs the startup signal, and the control circuit UC is configured to not load the power voltage onto the light source UL to let the light source emit light, when the NFC chip US does not output the startup signal.

In some embodiments, the NFC chip US is configured to output a pulsed startup signal to the control circuit UC when the NFC chip US begins to sense that there is an NFC signal, and the NFC chip US is configured to output a pulsed shutdown signal to the control circuit UC when the NFC chip US can no longer sense that there is an NFC signal. In other words, the NFC chip US is configured to output a startup signal or a shutdown signal when the NFC chip changes between being able to sense the NFC signal and not being able to sense the NFC signal. The control circuit is configured to continuously load the power voltage onto the light source UL after receiving the startup signal, until the shutdown signal is received, to let the light source emit light.

In some embodiments of the present disclosure, the tablet eraser includes multiple erasing areas, each of which is provided with an erasing unit UU. When the NFC signal is sensed by the NFC chip US of the erasing unit UU, the light source UL of the erasing unit UU emits light. When the NFC signal is not sensed by the NFC chip US of the erasing unit UU, the light source UL of the erasing unit UU does not emit light. In this way, by adjusting positions and sizes of different erasing areas on the tablet eraser, the tablet eraser can achieve erasing in different usage postures, and the light sources UL in each erasing area can be operated independently.

Figure 17:
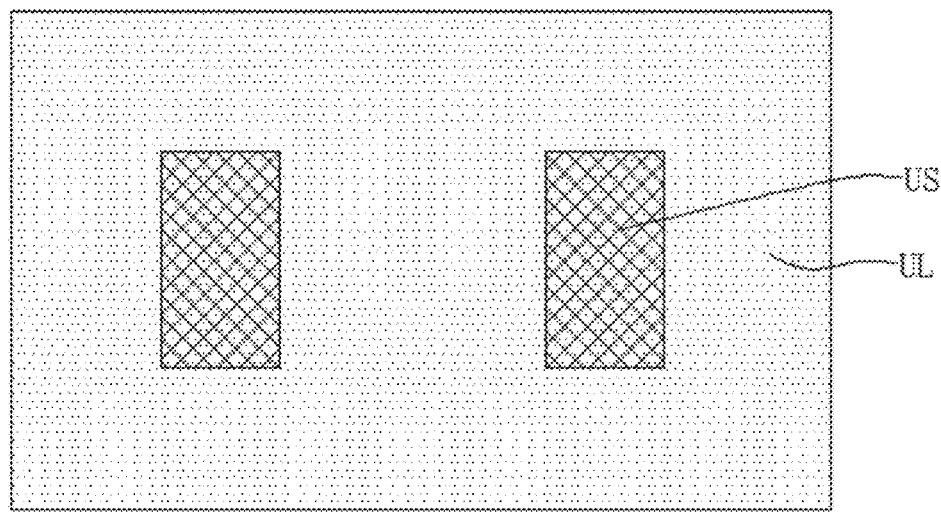
FIG. 17 is a schematic diagram of a structure of an erasing unit according to embodiments of the present disclosure.
Figure 18:
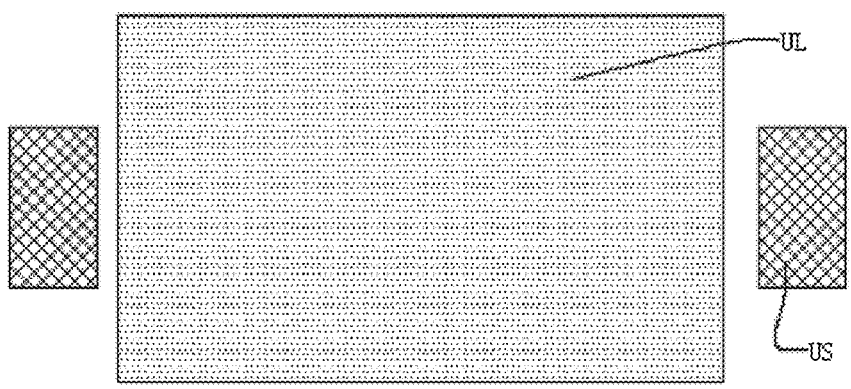
FIG. 18 is a schematic diagram of a structure of an erasing unit according to embodiments of the present disclosure.
Figure 19:
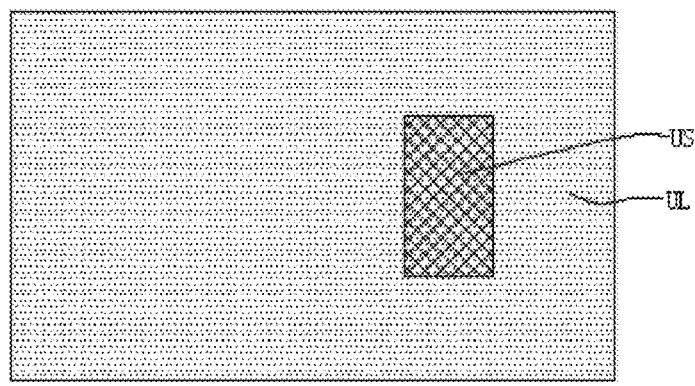
FIG. 19 is a schematic diagram of a structure of an erasing unit according to embodiments of the present disclosure.

Referring to FIGS. 17 to 19, within the same erasing unit UU, the NFC chip US and the light source UL can be arranged in overlapped manner or arranged adjacent to each other to ensure timely and accurate illumination of the light source UL. The erasing unit UU can be provided with one or more NFC chips US, and can also be provided with one or more light sources UL. It can be understood that the light emitted by the light source UL can be directly directed towards the handwriting tablet, as well as directed towards the handwriting tablet through a light guide plate, a light strip, and other means. In some embodiments of the present disclosure, the light source UL can be an LED (light-emitting diode).

In some embodiments, the erasing unit UU includes multiple LEDs as light sources UL, and the LEDs are evenly distributed within the erasing area.

In some embodiments, the light source UL of the erasing unit UU includes an LED arranged at a local position in the erasing area, and the LED evenly emits light from the erasing area through a light guide plate.

In some embodiments of the present disclosure, the tablet eraser has at least one erasing surface, and one or more erasing units UU can be arranged in the erasing surface. When the erasing surface is close to the handwriting area, the erasing unit UU on the erasing surface can emit light in response to the NFC signal, so that erasing of local areas of the handwriting tablet can be achieved.

Figure 15:
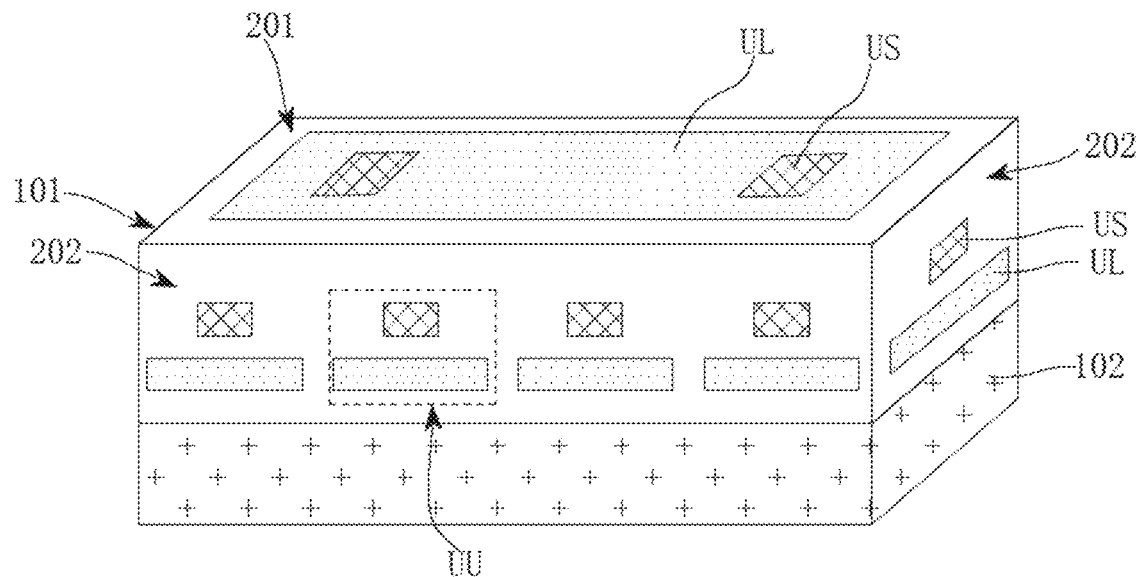
FIG. 15 is a schematic diagram of a structure of a tablet eraser according to embodiments of the present disclosure.
Figure 16:
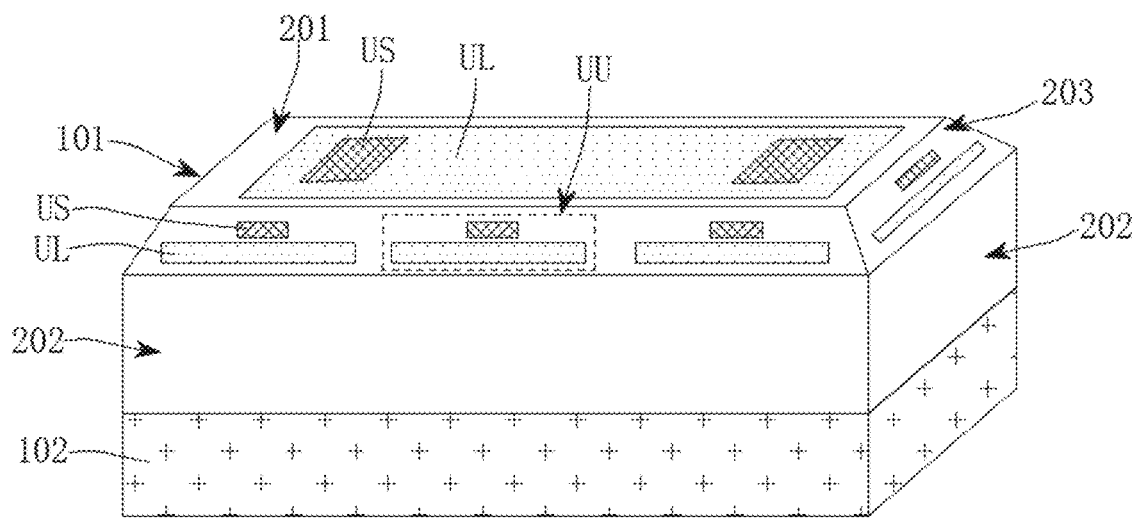
FIG. 16 is a schematic diagram of a structure of a tablet eraser according to embodiments of the present disclosure.

In some embodiments, referring to FIGS. 15 and 16, the tablet eraser can be in a strip shape as a whole, and includes a front surface 201 facing the handwriting tablet to erase the pattern on the handwriting tablet, a back surface facing opposite to the front surface 201, and four side surfaces 202 located between the front surface 201 and the back surface. One or more erasing units UU can be arranged on the front surface 201 of the tablet eraser.

In some embodiments of the present disclosure, the front surface 201 of the tablet eraser can be provided with an erasing unit UU, which can have a large luminous area when emitting light. For example, a luminous range covers the entire front surface 201. In this way, the front surface 201 of the tablet eraser can be used to efficiently erase large areas of patterns, improving the erasing efficiency.

In some embodiments of the present disclosure, as shown in FIG. 15, at least one side surface 202 of the tablet eraser is provided with an erasing unit UU, which has a small luminous area and is particularly suitable for erasing patterns in smaller areas, such as specific texts or characters.

In some embodiments, each side surface 202 of the tablet eraser is provided with an erasing unit UU to further improve the usage convenience.

On any side surface 202, the number of erasing units UU can be one or multiple. The more the erasing units UU there are, the higher the erasing accuracy that the tablet eraser can achieve. In some embodiments, multiple erasing units UU are arranged on at least one side surface of the tablet eraser, so that each erasing unit UU has a small luminous range, which improves the erasing accuracy.

In some embodiments of the present disclosure, as shown in FIG. 16, a chamfer 203 is provided between the front surface 201 and the side surface 202 of the tablet eraser, and an erasing unit UU can be arranged at the chamfer 203. In this way, the tablet eraser can erase patterns in a tilted state, making the usage habit and the usage effect of the tablet eraser to be approximately similar to those of a chalk eraser, improving the user experience and the erasing efficiency.

In some embodiments of the present disclosure, the tablet eraser includes a main body 101 and a grip part 102. A surface of the main body 101 away from the grip part 102 can serve as the front surface 201 of the tablet eraser. The erasing unit UU can be arranged on the main body 101.

In some embodiments of the present disclosure, as shown in FIG. 14, the tablet eraser further includes a power module UE to provide power to the erasing unit UU. In some embodiments, the power module UE is a rechargeable battery and is provided with a charging port.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. An array substrate comprising a handwriting area and a peripheral area surrounding the handwriting area, wherein the array substrate comprises erasing electrodes arranged in an array and a driving circuit for driving the erasing electrodes, the driving circuit is configured to load erasing voltages onto the erasing electrodes in response to illumination of preset light, and the array substrate is further provided with a Near Field Communication (NFC) coil for emitting an NFC signal, with a sensing range of the NFC coil covering the handwriting area; and wherein the array substrate comprises a base substrate, a driving layer, a sensing layer a base color layer and an anti-reflective layer, the base substrate and the driving layer are arranged in stacked manner, the sensing layer is located on a side of the driving layer close to the base substrate, the anti-reflective layer is located on a side of the sensing layer close to the driving layer, and the base color layer is located on a side of the sensing layer away from the driving layer.

2. The array substrate according to claim 1, wherein a sensing distance of the NFC coil is not greater than 10 cm.

3. The array substrate according to claim 1, wherein the erasing electrodes and the driving circuit are arranged in the driving layer.

4. The array substrate according to claim 3, wherein the driving layer is provided with a gate line extending along a row direction and a power line extending along a column direction, and the driving circuit comprises a thin film transistor, and wherein a source of the thin film transistor is electrically connected to the power line, a gate of the thin film transistor is electrically connected to the gate line, and a drain of the thin film transistor is electrically connected to an erasing electrode corresponding thereto.

5. The array substrate according to claim 3, wherein the NFC coil is arranged in the driving layer, the NFC coil comprises multiple sub-electrodes, and orthographic projections of the sub-electrodes on the base substrate are located between orthographic projections of the erasing electrodes on the base substrate.

6. The array substrate according to claim 5, wherein the driving layer comprises a gate layer that is provided with a gate line and a source-drain metal layer that is provided with a power line, some of the sub-electrodes are arranged in the gate layer and/or some of the sub-electrodes are arranged in the source-drain metal layer.

7. The array substrate according to claim 6, wherein the sub-electrodes comprise a row sub-electrode extending along a row direction and a column sub-electrode extending along a column direction, the row sub-electrode is located in the gate layer, and the column sub-electrode is located in the source-drain metal layer.

8. The array substrate according to claim 3, wherein the NFC coil is located within the sensing layer.

9. The array substrate according to claim 8, wherein a wiring of the NFC coil at least partially overlaps with the erasing electrodes.

10. A handwriting tablet comprising a cover plate, a liquid crystal layer, and the array substrate according to claim 1 arranged in stacked manner in sequence.

11. The handwriting tablet according to claim 10, wherein the cover plate is provided with a common electrode layer.

12. A tablet eraser, wherein the tablet eraser is provided with at least one erasing unit, the erasing unit comprises a light source and an NFC chip, and the erasing unit is configured to cause the light source to emit preset light in response to the NFC signal being sensed by the NFC chip, and to cause the light source not to emit light in response to the NFC signal being not sensed by the NFC chip.

13. The tablet eraser according to claim 12, wherein the erasing unit further comprises a control circuit, the control circuit is electrically connected to the NFC chip and the light source, and the control circuit is configured to drive the light source to emit light in response to a startup signal being received, and prevent driving of the light source to emit light in response to the startup signal not being received, wherein the startup signal is generated by the NFC chip in response to the NFC signal.

14. The tablet eraser according to claim 12, wherein the NFC chip and the light source in the erasing unit are arranged in overlapped manner or adjacent to each other.

15. The tablet eraser according to claim 12, wherein the tablet eraser comprises a front surface and a back surface arranged opposite to each other, and multiple side surfaces between the front surface and the back surface, and wherein the front surface of the tablet eraser is provided with at least one erasing unit.

16. The tablet eraser according to claim 15, wherein at least one of the side surfaces is provided with at least one erasing unit.

17. The tablet eraser according to claim 15, wherein the tablet eraser is provided with a chamfer between the front surface and the side surfaces, and at least one erasing unit is provided at the chamfer.

18. A handwriting tablet system comprising the handwriting tablet according to claim 10 and the tablet eraser according to claim 12.

19. A method for erasing a pattern, applied to the handwriting tablet system according to claim 18, the method for erasing a pattern comprising:
  emitting, by the NFC coil of the handwriting tablet, an NFC signal;
  emitting, by the light source of the tablet eraser, preset light, in response to the NFC signal being sensed by the NFC chip of the tablet eraser, and preventing light emitting of the light source of the tablet eraser, in response to the NFC signal being not sensed by the NFC chip of the tablet eraser; and
  loading, by the driving circuit of the handwriting tablet in response to being illuminated by the preset light, an erasing voltage onto the erasing electrode of the handwriting tablet.

* * * * *